Patented Nov. 26, 1940

2,222,591

UNITED STATES PATENT OFFICE 2,222,591

MILL GREASE

Philip S. Clarke, Richmond, and William E. Bradley, Los Angeles, Calif., assignors to Union Oil Company of California, Los Angeles, Calif., a corporation of California No Drawing. Application July 20, 1937,
Serial No. 154,608

16 Claims. (Cl. 252—12)

The present invention relates to lubricants, and more particularly pertains to a new grease for use on open bearings operating at high temperatures, such lubricant being commonly known as mill grease or brick grease.

Heavy machinery used in cement mills, paper mills, laundries, etc., is usually equipped with open bearings which are lubricated by bricks of mill grease. It is due to its form that this mill grease is frequently termed "brick grease." In view of the fact that these open bearings operate under severe conditions of relatively high temperature low journal speeds, and sometimes high pressure, it is obvious that the brick or mill greases employed for the lubrication of these bearings must withstand the above high temperature conditions. Some of the bearings in this type of equipment operate at temperatures ranging from about 100° F. to approximately 325° F., and even higher. The mill greases employed must necessarily withstand these temperatures without any formation of hard or coke-like films on the surface exposed to the bearing, as well as without melting or decomposition. Glazing, hardening or carbonization of the grease is undesirable since it results in inadequate lubrication. Another form of disintegration of a mill grease occurs when the grease becomes too tough or fibrous in nature. This results in the grease being pulled through the bearings at excessive rates, which obviously increases consumption.

It is therefore an object of the present invention to provide an improved mill or brick grease which exhibits little or even substantially no tendency to glaze, carbonize and/or toughen and become fibrous. Another object of the invention is to provide a brick grease which will maintain its lubricating characteristics even when used on bearings operating over a relatively wide range of temperatures.

It has now been discovered that the above and other objects may be attained by compounding or otherwise manufacturing a mill or brick grease which contains an oxidation-resisting oil and a particular type of soap or combination of soaps. Thus, it has been discovered that a grease containing a paraffin base lubricating oil or one predominating in paraffinic constituents, and a mixture of soaps obtained by the saponification of a combination of certain fats and of rosin oil, exhibits the above desirable characteristics and offers unexpected resistance to wear when used for the purpose of lubricating the above described type of mill bearings. The fat employed in the preparation of the grease is preferably a mixture of tallow and degras. The presence of soaps of degras in the grease has been found highly advantageous because of the high molecular weight alcohols present in said degras, these alcohols promoting solubility between the soap and the oil, which results in a grease having gel-type characteristics. Also, the presence of degras, of metal degras soaps, or of mixtures thereof, affects the texture of the final grease, such greases containing degras being more resistant to toughening and the formation of fibers.

Although tallow and degras have been mentioned as the fats which are preferred in the manufacture of the improved brick or mill grease, other fats or fatty acids may be substituted for all or a part of the tallow. Thus, cottonseed oil, lard oil, coconut oil, tallow fatty acids, etc., may be employed. It is to be noted, however, that the texture, and therefore the quality of the final grease may vary with the substitution of other types of fats for all or a part of the tallow used as the soap stock. As an example, it may be stated that the use of certain quantities of cottonseed oil, together with prime tallow, degras and rosin oil, results in a brick grease having even better qualities than when the grease does not contain the cottonseed oil. This is believed to be due to the fact that the saponification of this vegetable oil yields a soap which is more soluble in mineral oil than tallow soap, thus resulting in a grease having a more uniform texture. On the other hand, a complete substitution of cottonseed oil for the tallow will result in an inferior grade of grease since it will be too soft and have a melting point much lower than that of a grease in which the tallow soap has not been replaced by any cottonseed oil soap.

In the manufacture of the brick or mill grease, it is advisable to employ a rosin oil having a relatively high saponification number. Instead of a part of the rosin oil, it is also possible to use rosin. However, the substitution of too great a proportion of rosin for or in place of the rosin oil produces a final grease product of an inferior quality in view of its relatively high rate of consumption.

As previously stated, it is desirable to employ an oxidation-resisting mineral oil. As such, one may use the well-known paraffine base or Pennsylvania lubricating oils, as well as the highly refined paraffinic fractions obtained from the solvent refining or extraction of mixed base or similar oils. Obviously, the gravities, flash points and viscosities of these mineral oils will vary with the characteristics of the grease to be produced. One of the advantages derived from the use of the more paraffinic fractions resides in the fact that the greases containing them will not melt or glaze at the relatively high temperatures, whereas brick greases containing the same grade of a Western or naphthene base oil will melt or at least produce a hard film on the bearings at such high temperatures.

Although caustic soda is the usual saponifying agent employed in the manufacture of high temperature greases in general, and brick or mill greases in particular, it is possible to use other alkalies such as potassium hydroxide. Moreover, the presence of relatively small amounts of some alkaline earth soaps in conjunction with the alkali soaps improves the texture of the grease and prevents it from being or becoming granular. For this purpose, it has been found advantageous to use both caustic soda and some hydrated lime for the saponification of the fats, degras and other saponifiable materials which go into the formation of the soap in the grease. It is to be noted, however, that the presence of calcium is not absolutely essential, since, although its absence tends to form a brick grease having a slightly granular texture, this can be remedied somewhat by increasing the ratio of cottonseed oil to tallow used in the manufacture of the soap.

The water content of the final grease is important, and must be controlled within relatively narrow limits. Thus, if the water content drops below a certain predetermined minimum the resulting grease becomes granular, while too much water causes the brick grease to be consumed rapidly at the operating temperatures. The optimum range of water content will vary with the constituents used in the manufacture of a given brick grease. Thus, in the case of the mill grease of the gel type discussed more fully hereinbelow, it has been found that the water content should be between about 0.3% and 1.5% by weight of the final product, and that the best results have been obtained when the grease contained about 0.6% of water. On the other hand, in some instances, this water content may be as high as 2%, and as low as 0.1%.

The invention may therefore be broadly stated as residing in a lubricant suitable for the lubrication of heavy machinery, such as cement mill bearings, etc., said lubricant or grease comprising an oxidation resisting oil and a soap produced by the saponification of rosin oil and/or rosin and of a fat or a combination of fats and/or fatty acids. It has been found, however, that preferably the ingredients used should always include some rosin oil, some degras and some fat. More specifically stated, the invention resided in an improved mill or brick grease containing an oxidation-resisting mineral oil and the products of saponification of rosin oil with or without some rosin on one hand, and a degras and a fat or a combination of fats with or without fatty acids, such as tallow, cotton seed oil, lard oil, coconut oil, etc., on the other hand. The invention still further resides in an improved mill grease containing both sodium and calcium soaps which have been derived from the above saponifiable materials. The invention still further resides in a brick grease containing the above mineral oil and soap combination, and in which the water content is maintained within an optimum and limited range, preferably between 0.3% and about 1.5% by weight of the final product.

Although as stated, the mineral oil may vary as to gravity, flash and viscosity, depending on the desired qualities in the final grease, it has still further been discovered that excellent results are obtained when the lubricating oil employed in the manufacture of the brick grease has a viscosity gravity constant of less than 0.860. In other words, it is preferred to use a mineral oil, the viscosity of which varies only slightly with changes in temperature. Since a viscosity gravity constant of 0.860 is considered to be the dividing line between the oxidation-resisting paraffine base oils, or raffinates produced by solvent extraction, and the relatively undesirable naphthene or mixed base stocks, the above reference to the use of lubricating oil stocks having a viscosity gravity constant of less than 0.860 merely reiterates that the greases made according to the present invention should include the oxidation-resisting mineral oils as one of the ingredients. It may therefore be stated that the invention includes a brick grease prepared by compounding the soaps of rosin oil and/or rosin, and the soaps of fats, fatty acids and degras, with an oxidation-resisting mineral lubricating oil the viscosity-gravity constant of which is less than 0.860, and especially where the water content of the product is within the range of 0.3% to about 1.5% as above indicated.

The invention still further resides in an improved brick or mill grease comprising from 12 to 30% of soaps obtained by the saponification of tallow, cottonseed oil, rosin oil and degras, and from 50% to about 83% of an oxidation-resisting mineral oil with a viscosity-gravity constant of less than 0.860. The invention also includes a grease of the above type containing small but controlled quantities of water, free sodium hydroxide and glycerine. In other words, the grease contains from about 50% to perhaps 85% of oil, from about 50% to 15% of soaps and unsaponifiable materials, such as remain from saponification of fats, and small quantities of water, NaOH and glycerine.

The following exemplifies the method of manufacturing an improved brick or mill grease according to the present invention, it being understood that the percentages of the various ingredients, as well as the method of operation may vary without departing from the scope of the invention. For the preparation of a 1500 pound batch of brick grease, the following quantities of the various ingredients were found to produce a highly satisfactory product:

| | Pounds |
|---|---|
| Prime tallow | 69 |
| Rosin oil | 300 |
| Degras | 88 |
| Cottonseed oil | 46 |
| Mineral oil | 975 |
| Hydrated lime | 3½ |
| Dry caustic soda | 40 |
| Water | about 200 |

At the outset it is necessary to state that the quantity of alkali indicated above will vary depending on the saponification numbers of the above saponifiable materials employed. The actual quantity of alkali (both the calcium and the sodium hydroxides) employed in each batch, in fact, is to be controlled so that it is substantially just sufficient to saponify all of the fats and rosin oil. In the instant case, the quantities of alkali given hereinabove were calculated on the basis of the following saponification numbers of these fats, etc.:

| Saponifiable material | Saponification number |
|---|---|
| Prime tallow | 197 |
| Cottonseed oil | 195 |
| Rosin oil | 99 |
| Degras | 105 |

In operation, the tallow, cotton seed oil, degras, rosin oil and approximately 400 pounds of the mineral oil (which in the instant case was a Pennsylvania lubricating oil having a viscosity-gravity constant of 0.816 and an S. A. E. grade of 20) were charged into a kettle equipped with heating and agitating means. The mixture was thoroughly stirred and preheated to about 155° F., after which the calcium hydroxide in solution in about 40 pounds of water, was added. The mixture, being continuously agitated, was then heated for about 30 minutes at a temperature of approximately 170° F. Thereafter, the sodium hydroxide was gradually added in the form of a 20% aqueous solution, this addition requiring approximately 45 minutes. During this addition of the caustic soda, as well as for about an hour thereafter, the temperature must be maintained below the boiling point of water, and preferably at about 170° to 180° F. This is because a rise in temperature above 212° F. at this stage of operation causes a loss of caustic, presumably due to some side reactions between the alkali and glycerine formed by the saponification.

The temperature of the mixture in the kettle was then gradually raised to 212° F. at which time the free alkali content was adjusted by the addition of rosin oil or of caustic soda solution so that the desired alkalinity be produced in the final grease. It is obvious that this step is optional since the presence of free sodium hydroxide is controllable by other means. The temperature of the grease in the kettle was then gradually raised and simultaneously the rest of the lubricating oil was gradually added, the mixture in the kettle being constantly agitated. During this operation the temperature of the grease gradually rose to 220° F. Dehydration of the grease was continued, and at about 232° F. the water content was approximately 2.6%. At this point it was noted that the frothing of the mass in the kettle subsided considerably. In fact, this decrease in the frothing of the greast is quite apparent, and generally coincides with a temperature of about 232° F. and a water content of 2.6% as calculated by weight of the grease depending on the equipment used and the operating conditions. After this condition is attained, the grease in the kettle was then rapidly heated to 275° F. and drawn at that temperature into the cooling pans or trays, this drawing resulting in a grease containing between 0.3% and 1.5% of water. It is to be noted, however, that the drawing temperature may vary with the particular equipment employed and with the operating conditions. Therefore, it is essential to determine in each case the optimum maximum temperature so that the final grease will have the desired water content. It was noticed that very little loss in water is obtained during the drawing step, which, however, must be carried out very rapidly to produce a uniform grease of the desired texture, consistency, etc.

The resultant brick grease was found to be highly suitable for the lubrication of heavy machinery operating at temperatures as high as 320° F., and at relatively low journal speeds. The grease was of the gel type, did not melt nor glaze at these high temperatures, and the rate of consumption of this grease was found to be quite economical. The grease contained approximately 0.5% by weight of water; about 75% of oil and unsaponifiable materials; 10.9% of sodium fat soap; 9.5% of sodium rosin oil soap; about 2% of calcium rosin oil soap; less than 0.1% of free sodium hydroxide; and small quantities of free fat and glycerine (approximately 1% or less of each).

It is believed to be clear from the description that a wide variety of formulae may be used within the workable ranges of proportions of the ingredients shown in the herein described invention. Thus, it has been disclosed that the percentage of soaps in the brick grease may vary between about 12% and 30% by weight of the grease, while the quantity of mineral oil employed may be as low as 50% and as high as 83% of the final product. Similarly, the water content may vary from about 0.3% to as high as 2%, although, preferably, it should not exceed 1.5%. The ratio of calcium soap to sodium soap may be as high as 1:5, although a ratio closer to 1:10 has been found to produce a better brick grease. As to the cottonseed oil, the use of this ingredient, as stated, may be completely avoided. However, in some instances it may be used in quantities as high as 3 parts thereof to one part of tallow. The workable range of degras is comprised between about 1% to 10% by weight of the grease, depending on the quantities of the other ingredients employed, as well as on the final product desired. It is therefore understood that the present invention is not limited to particular ingredients and proportions except in accordance with the spirit and scope of the appended claims.

We claim:

1. A solid grease for heavy machinery operating at high temperatures, consisting essentially of an oxidation-resisting mineral oil predominating in paraffinic constituents, sodium and calcium soap of a substance containing abietic acid, and products of saponification of degras and of at least one other fatty substance, the sodium soaps predominating over the calcium soaps.

2. A product according to claim 1, which also contains an optimum and limited quantity of water approximating one-half percent by weight of the product.

3. In a product according to claim 1, wherein the mineral oil has a viscosity-gravity constant of less than 0.860.

4. A solid mill grease consisting essentially of between about 50% and 83% by weight of an oxidation-resisting mineral oil having a viscosity gravity constant of less than 0.860, of from about 12% to 30% by weight of a mixture of calcium and sodium soaps of rosin oil and of saponification products of degras and of at least one other fatty substance, and of between about 0.3% and 1.5% of water, as well as incidental unsaponifiables, the sodium soaps predominating over the calcium soaps.

5. A solid mill grease consisting approximately of about 75% of an oxidation-resisting oil and of unsaponifiable materials, 10.9% of sodium soaps of degras, tallow and cottonseed oil, 9.5% of sodium rosin oil soap, 2.0% of calcium rosin oil soap, 0.5% of water, less than 0.1% of free sodium hydroxide, and less than 1% each of free fat and glycerin.

6. A solid lubricating grease consisting primarily of an oxidation-resisting mineral oil having a viscosity gravity constant below about 0.860, a fat soap and the saponification products from degras and rosin oil, including a minor proportion of calcium soap and a major portion of sodium soap.

7. A hard lubricant for heavy machinery consisting primarily of an oxidation-resisting mineral oil having a viscosity gravity constant below about 0.86, a mixture of the products of saponification of materials containing abietic acid, degras and fat or fatty acids, the soaps constituting a minor percentage of calcium soap and a major percentage of sodium soap, and between 0.1% and 2% of water.

8. A solid grease for heavy machinery having a melting point above about 320° F. and consisting primarily of an oxidation-resistant mineral oil of predominately paraffinic character, water in the order of about one-half percent, and the products of saponification of degras and rosin oil and another fatty material, the resultant soap containing a minor proportion of calcium soap and a major portion of sodium soap.

9. A hard grease containing as its principal constituents a lubricating oil having a viscosity gravity constant below about 0.86 and high oxidation stability, the saponification products of rosin oil, the saponification products of degras, the saponification products of a fat, and from 0.1% to 1.5% of water, the degras and rosin oil saponification products being sufficient to insure a gel structure, and the soaps comprising a major proportion of sodium soap and a minor proportion of calcium soap.

10. A grease according to claim 9 wherein the water content approximates one-half percent.

11. A grease according to claim 9 whose melting point is above about 320° F.

12. A grease according to claim 9 wherein the calcium soap is rosin soap.

13. A brick grease comprising as its principal constituents a paraffinic type lubricating oil, a fat soap, the saponification products of rosin oil, the saponification products of degras, and water in the order of about one-half percent, the soaps comprising a major proportion of sodium soap and a minor proportion of calcium soap, and the grease having a gel structure.

14. A solid mill grease consisting principally of an oxidation-resistant mineral oil having a viscosity gravity constant below about 0.86, the saponification products of tallow, cottonseed oil, degras and rosin materials, the soaps comprising a minor proportion of calcium soap and a major proportion of sodium soap, and between 0.1% and 1.5% of water.

15. A brick grease whose principal constituents consist of a paraffinic type lubricating oil of high oxidation stability, a fat soap, the saponification products of rosin oil and the saponification products of degras in proportions to create a gel structure, the soaps being calcium and sodium soaps, and approximately one-half percent of water, the sodium soaps predominating over the calcium soaps.

16. A brick grease according to claim 15 whose melting point is above about 320° F.

PHILIP S. CLARKE.
WILLIAM E. BRADLEY.